United States Patent
Zakrzewski

(10) Patent No.: US 7,583,594 B2
(45) Date of Patent: Sep. 1, 2009

(54) ADAPTIVE TRANSMIT WINDOW CONTROL MECHANISM FOR PACKET TRANSPORT IN A UNIVERSAL PORT OR MULTI-CHANNEL ENVIRONMENT

(75) Inventor: Adrian Zakrzewski, Bethesda, MD (US)

(73) Assignee: Texas Instruments Incorporated, Dallas, TX (US)

(*) Notice: Subject to any disclaimer, the term of this patent is extended or adjusted under 35 U.S.C. 154(b) by 814 days.

(21) Appl. No.: 10/355,053

(22) Filed: Jan. 31, 2003

(65) Prior Publication Data

US 2004/0151113 A1    Aug. 5, 2004

(51) Int. Cl.
*H04L 12/26* (2006.01)
*G06F 15/16* (2006.01)

(52) U.S. Cl. .................................. 370/229; 709/235
(58) Field of Classification Search .................. None
See application file for complete search history.

(56) References Cited

U.S. PATENT DOCUMENTS

| | | | |
|---|---|---|---|
| 5,764,625 A * | 6/1998 | Bournas | 370/231 |
| 6,038,606 A * | 3/2000 | Brooks et al. | 709/235 |
| 6,105,064 A * | 8/2000 | Davis et al. | 709/224 |
| 6,119,235 A * | 9/2000 | Vaid et al. | 726/11 |
| 6,215,769 B1 * | 4/2001 | Ghani et al. | 370/230 |
| 6,370,114 B1 * | 4/2002 | Gullicksen et al. | 370/229 |
| 7,047,312 B1 * | 5/2006 | Aweya et al. | 709/235 |
| 2004/0062201 A1 * | 4/2004 | Deshpande | 370/235 |

* cited by examiner

*Primary Examiner*—Ricky Ngo
*Assistant Examiner*—Clemence Han
(74) *Attorney, Agent, or Firm*—Steven A. Shaw; W. James Brady; Frederick J. Telecky, Jr.

(57) ABSTRACT

The transmit window size of a Simple Packet Relay Transport protocol packet transmission system can determine the efficiency of transmission and the memory requirements of the transmitter. A sufficiently large transmit window must be maintained to avoid transmission waits which can reduce the utilization of available transmission path bandwidth. However, an oversize window will require excess buffer capacity and therefore utilize additional storage space on the transmitter. A balance in window size is dynamically achieved through monitoring of the buffer write operations to determine the accessibility of the transmit buffer based upon packet transmission utilization and packet consumption acknowledgment.

7 Claims, 2 Drawing Sheets

ADAPTIVE TRANSMIT WINDOW CONTROL MECHANISM FOR PACKET TRANSPORT IN A UNIVERSAL PORT OR MULTI-CHANNEL ENVIRONMENT

CROSS REFERENCE TO RELATED APPLICATIONS

None

FIELD OF THE INVENTION

The present invention relates to packet flow control in a transport layer protocol. More specifically, the present invention relates to the reduction of the size of a transmit window in a SPRT protocol to improve the utilization of a shared transmit buffer.

BACKGROUND OF THE INVENTION

Simple Packet Relay Transport (SPRT) is a reliable transport protocol designed for IP networks. The SPRT protocol uses a windowing mechanism for flow control. The protocol establishes a transmit window size which requires an allocation of a corresponding transmit buffer space. The transmitter sends packets which are received into the receive buffer. Receipt of the packets is acknowledged to the sender. As the packets are retrieved from the receive buffer, they are consumed by the recipient and the consumption of packets is acknowledged to the sender.

The SPRT protocol restricts the size of the transmit window, preventing the transmitter from sending more than the number of packets allocated to the window size ($N_{wnd}$) without receipt of consumption acknowledgment from the receiver. The transmit buffer will fill to the size of the transmit window and send packets to the network at the appropriate network rate. The transmitter continues to send packets from the buffer and continues to refill the buffer as long as a consumption acknowledgment is received. Once the transmitter sends a number of packets equal to $N_{wnd}$ without receipt of a consumption acknowledgment, the transmit buffer will refill but will not transmit until a consumption acknowledgment is received. If the transmit window is too small, the IP link will have idle periods where no packets are transmitted after the transmit window is emptied, while the transmitter is waiting for a consumption acknowledgment. The transmitter must wait for receipt of an acknowledgment before it can send additional packets.

In order to fully utilize the IP capacity, without idle transmit times, the transmit window must be large enough to continue transmitting until consumption acknowledgment is received. If the transmit window is exhausted before a consumption acknowledgment is received, then transmission will stop, waiting for a consumption acknowledgment, thus wasting bandwidth.

Because an undersized window will waste bandwidth, large windows are more often implemented in order to avoid wasted bandwidth. However, a large window will consume additional memory space in the sender. A window which is larger than appropriate for the network and data rate, will provide no performance benefits. Because memory requirement for buffering transmission packets are substantial, it is desirable to limit the window size to the smallest possible value without losing performance.

SUMMARY OF THE INVENTION

An object of the present invention is to optimize the size of the transmit window in a SPRT packet protocol to maximize bandwidth utilization while minimizing buffer capacity requirements.

The SPRT protocol is defined to use a maximum window size $N_{max}$. The size of the window for any particular connection is negotiated between the remote ends. Large arbitrary default values are set in the SPRT standard to avoid use of undersized windows, thereby wasting bandwidth. In most connections, it is probable that the default values will be the only values commonly used. Use of unnecessarily large window values will place a high demand on memory which will be required to support the window size.

The present invention introduces a dynamic transmit window in the transmitter that is contained within the range of 1 to $N_{max}$. Reduction in the size of the transmit window below $N_{max}$ will have no effect on the receiver.

The size of the transmit window, the optimal value of $N_{wnd}$, (designated $N_{cur}$ to denote the current window size which is between $1 \leq N_{cur} \leq N_{max}$) is determined based on network delay measured as round trip time RTT, network packet loss and source data rate $R_{src}$. In order to fully utilize the IP link, the transmit window size must be at least as large as the RTT:

$$W \geq RTT * R_{src}$$

Where W is the window capacity expressed in bits.

In the simple case, where each packet has the same length (L) than:

$$W = L * N_{wnd}$$

For example, if the RTT is one second and the $R_{src}$ is 100 bits/sec, then the minimum transmit window size will be 100 bits because it will take at least one second for acknowledgment of the consumption of the first bit to be received by the transmitter, even if the first bit is immediately consumed. However, if the window is exactly matched to the RTT and $R_{src}$ than any slight change in network conditions will result in an undersize or oversize of the transmit window. Therefore the present invention teaches an algorithm for monitoring the widow size during transmission and dynamically adjusting the widow size and corresponding allocated memory space as needed.

FIG. 1 illustrates a transmit buffer 11 having storage capacity for ten packets number 1 through 10. If the transmit window is set to ten, then a single transmit window will consume the available memory space. However, it is desirable to share buffer space in a transmitter among several transmit windows operating in a multiple channel environment or universal port environment. If, after transmission of packets 1, 2, 3 and 4, as illustrated in FIG. 1, the receiver consumes packet 1 from the receive buffer 12 and sends a consumption acknowledgment to the transmitter, the transmit window does not need to be any greater than five packets. By limiting the transmit window to five packets, the available buffer space in transmit buffer 11 can accommodate two channels.

FIG. 2 illustrates the delay, or underutilization of the available bandwidth which can occur if the window size is too small. In FIG. 2, the available buffer space allocated to a window is two packets. Therefore, once packets 1 and 2 have been transmitted, the transmitter must wait two cycles for a consumption acknowledgment before sending the third packet.

BRIEF DESCRIPTION OF THE DRAWINGS

Exemplary embodiments of the present invention are discussed with reference to the following drawings.

DETAILED DESCRIPTION OF THE INVENTION

The function used to send a packet via SPRT can be stated as:

Bool send(int size, char *buf)

Figure 1:
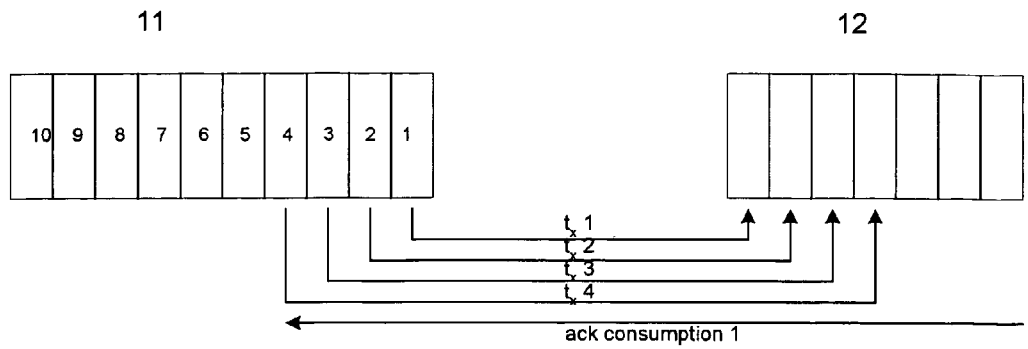
FIG. 1 is a block diagram illustrating representative transmit and receive buffers.
Figure 2:
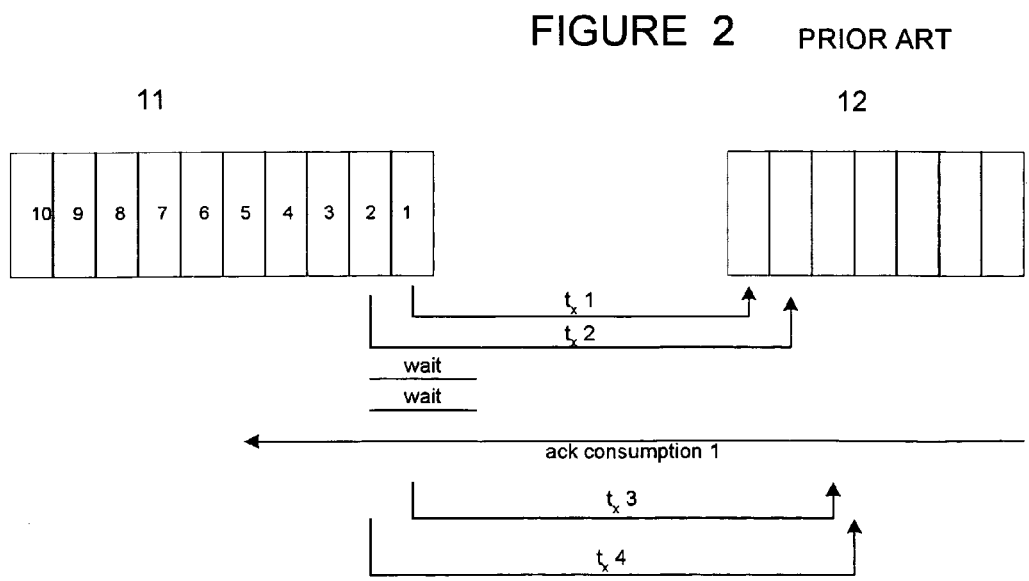
FIG. 2 is a block diagram illustrating the use of an undersized transmit window.
Figure 3:
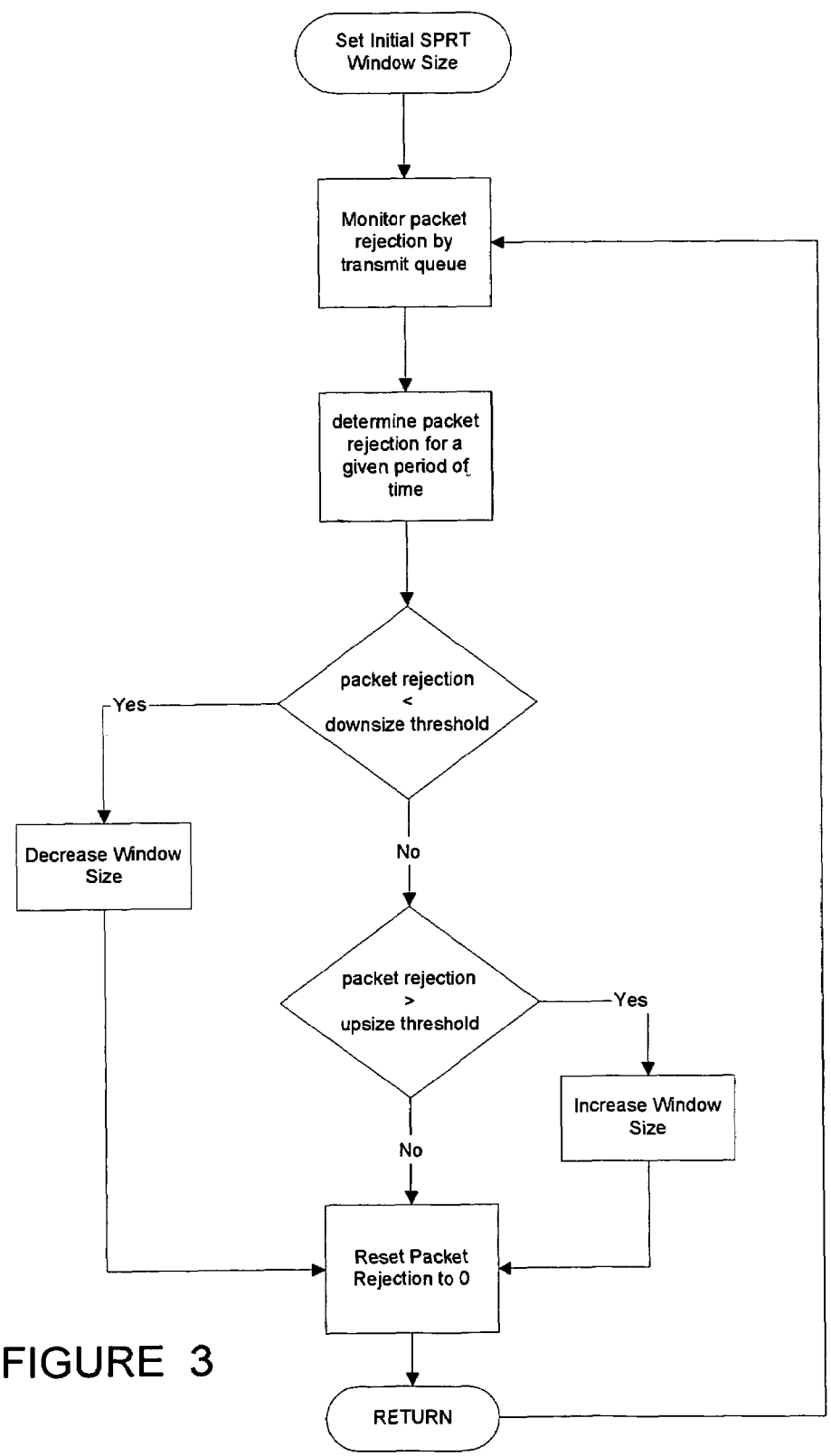
FIG. 3 is a logical flow diagram illustrating the dynamic window size adaption of the present invention.

This function will return a true value if the packet was unsuccessfully placed in the transmit queue, or buffer. The function fails if the transmit queue, or buffer, is full, i.e. transmit window is exhausted. The present invention, as illustrated in FIG. 3, also has a counter function to track the number of successes and failures of the attempts to place send packets in to the send, or transmit, buffer. If no failures occur, then the transmit window is sufficiently large. However, this is not an indication that the link utilization is 100%, which may not be required if the source rate is sufficiently low so as not to require full bandwidth utilization.

The present invention reduces the window size, without decreasing the data rate, by modification of the window, and therefore the transmit buffer, size based upon the detection and tracking of window, or transmit buffer, write failures. Typically, a minimum number of write failures maybe experienced even when the window size is sufficiently large. The present invention therefore sets a threshold value for the number of acceptable failures in a given measured period of time. This threshold value is referred to as the downsize threshold. If the number of failures detected in a given period of time is below the downsize threshold, then the size of the window, and therefore the transmit buffer, can be decreased.

The present invention also sets a threshold value for the number of unacceptable failures in a given period of time. This threshold value is referred to as the upsize threshold. If the number of failures for a particular size window exceeds the upsize threshold, then the window is too small and needs to be increased.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for dynamic configuration of a size of a dynamic transmit window in a transmitter of a Simple Packet Relay Transport protocol message communication system, comprising:
   establishing a minimum window size value and a maximum window size value;
   constraining the size of said dynamic transmit window between said minimum size value and said maximum size value;
   monitoring packet consumption acknowledgement as a reflection of a current round trip time of travel (RTT) of a packet transmitted in said communication system;
   determining the size of said dynamic transmit window based upon said monitored packet consumption acknowledgement and a data rate of said packet, where the data rate is established in bits per unit time and the dynamic window size is equal to the data rate times the length of said RTT, further comprising:
   monitoring window write failures and an absence of window write failures in said dynamic transmit window during transmission; and
   utilizing maximum available bandwidth while minimizing buffer capacity requirements of a buffer by dynamically adjusting said size of said dynamic transmit window and corresponding allocated memory space in said buffer as needed, based upon said monitoring of window write failures and the absence of window write failures.

2. The method of claim 1, further including:
matching said dynamic transmit window size to said reflection of said RTT and said data rate prior to said monitoring of window write failures.

3. The method of claim 1, further comprising:
increasing the size of said dynamic transmit window when the number of window write failures within a predetermined time period exceed a threshold.

4. The method of claim 1, further comprising:
monitoring said dynamic transmit window to determine if said dynamic transmit window has reached a full state; and
decreasing the size of said dynamic transmit window when the dynamic transmit window is in a partial full state for a percentage of time exceeding a predetermined threshold.

5. A method for dynamic configuration of a size of a dynamic transmit buffer in a transmitter of a Simple Packet Relay Transport protocol message communication system, comprising:
   establishing a dynamic transmit buffer connected to a network;
   transmitting a plurality of packets, said plurality of packets having a first packet and a last packet, from said transmit buffer at a transmit time, across said network to a receiver;
   receiving consumption acknowledgement of said packets at a consumption acknowledgement time from said receiver;
   monitoring a round trip time of travel of said packets based upon the difference between said transmit time and said consumption acknowledgement time;
   determining a data transmission rate of said communication network;
   establishing a size of said dynamic transmit buffer based upon said monitored round trip time and said data transmission rate of said packet established in bits per unit time, and the dynamic transmit buffer size is equal to the data transmission rate times the length of said monitored round trip time; and
   wherein said size of said dynamic transmit buffer is established between a downsize threshold and an upsize threshold to constrain said dynamic transmit buffer to contain sufficient packets to continue transmission of said last packet substantially contemporaneous with the receipt of a consumption acknowledgment of said first packet is received at said transmitter to thereby maximize bandwidth utilization while minimizing a capacity of said dynamic transmit buffer.

6. A method for dynamic configuration of a size of a dynamic transmit window in a transmitter of a Simple Packet Relay Transport protocol message communication system, comprising:
- monitoring packet rejection based on results of a packet send function;
- determining a current rate of packet rejection;
- maximizing bandwidth utilization while minimizing buffer capacity requirements of a buffer by adjusting said size of said dynamic transmit window and corresponding allocated memory space in said buffer, based upon said determined current rate of packet rejection; wherein:
- said size of said dynamic transmit window and corresponding allocated memory space in said buffer is reduced when the current rate of packet rejection is below a downsize threshold.

7. The method of claim 6, wherein
said increase in said size of said dynamic transmit window is implemented when the current rate of packet rejection exceeds an upsize threshold.

\* \* \* \* \*

UNITED STATES PATENT AND TRADEMARK OFFICE
CERTIFICATE OF CORRECTION

PATENT NO. : 7,583,594 B2  Page 1 of 1
APPLICATION NO. : 10/355053
DATED : September 1, 2009
INVENTOR(S) : Adrian Zakrzewski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Fourteenth Day of September, 2010

David J. Kappos
*Director of the United States Patent and Trademark Office*